(12) United States Patent
Huang et al.

(10) Patent No.: US 9,264,697 B2
(45) Date of Patent: Feb. 16, 2016

(54) STEREO DISPLAY APPARATUS HAVING ADJUSTABLE LIQUID CRYSTAL LENS ARRAY

(75) Inventors: Shih-Fong Huang, Nantou County (TW); Hsu-Ping Chiu, Taoyuan County (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 427 days.

(21) Appl. No.: 13/606,014

(22) Filed: Sep. 7, 2012

(65) Prior Publication Data

US 2014/0002758 A1 Jan. 2, 2014

(30) Foreign Application Priority Data

Jul. 2, 2012 (TW) .............................. 101123725 A

(51) Int. Cl.
*G02B 27/22* (2006.01)
*H04N 13/04* (2006.01)
*G02B 3/14* (2006.01)

(52) U.S. Cl.
CPC .............. *H04N 13/0404* (2013.01); *G02B 3/14* (2013.01); *G02B 27/2214* (2013.01)

(58) Field of Classification Search
USPC .......................................................... 349/15
See application file for complete search history.

(56) References Cited

U.S. PATENT DOCUMENTS

| 7,750,981 | B2 | 7/2010 | Shestak et al. | |
| 2006/0082519 | A1* | 4/2006 | Nam et al. | 345/9 |
| 2008/0266387 | A1* | 10/2008 | Krijn et al. | 348/51 |
| 2010/0259697 | A1* | 10/2010 | Sakamoto et al. | 349/15 |
| 2011/0043715 | A1* | 2/2011 | Ohyama et al. | 349/15 |
| 2011/0267338 | A1 | 11/2011 | Nam et al. | |

FOREIGN PATENT DOCUMENTS

| CN | 1764288 | 4/2006 |
| CN | 1920615 | 2/2007 |
| CN | 1988677 | 6/2007 |
| TW | M410884 | 9/2011 |

OTHER PUBLICATIONS

"Office Action of China Counterpart Application", issued on Sep. 3, 2014, p. 1-p. 6, in which the listed reference was cited.
"Office Action of Taiwan Counterpart Application", issued on Feb. 19, 2013, p. 1-p. 5, in which the listed references were cited.

* cited by examiner

*Primary Examiner* — Lauren Nguyen
(74) *Attorney, Agent, or Firm* — Jianq Chyun IP Office

(57) ABSTRACT

A stereo display apparatus is provided, including a display panel and an adjustable liquid crystal lens array. The adjustable liquid crystal lens array includes a liquid crystal layer and first and second substrates disposed at opposite sides of the liquid crystal layer. The first substrate includes first and second electrodes. The first and second electrodes respectively have a plurality of first and second branch portions arranged alternately. There are first and second pitches respectively between two of the first branch portions adjacent and two of the second branch portions adjacent. The second substrate includes a third electrode. When there is an electric potential difference between the third electrode and the first or the second electrode, an equivalent refractive index of the liquid crystal layer progressively increases from the two first or second branch portions adjacent to central of the two first or second branch portions adjacent.

9 Claims, 4 Drawing Sheets

STEREO DISPLAY APPARATUS HAVING ADJUSTABLE LIQUID CRYSTAL LENS ARRAY

CROSS-REFERENCE TO RELATED APPLICATION

This application claims the priority benefit of Taiwan application serial no. 101123725, filed on Jul. 2, 2012. The entirety of the above-mentioned patent application is hereby incorporated by reference herein and made a part of this specification.

BACKGROUND OF THE INVENTION

1. Field of the Invention

The disclosure relates to a stereo display apparatus, and particularly relates to an auto-stereoscopic display apparatus.

2. Description of the Related Art

The development of display technology not only aims at lightness, slimness, shortness, and compactness but also aims at the capability of displaying a stereo image. Currently, the technology of stereo display can be divided into the technology of stereoscopic display, with which the viewer has to wear a specifically designed eyeglass for viewing, and the technology of auto-stereoscopic display, with which the viewer is allowed to view with naked eyes.

Taking the technology of auto-stereoscopic display, a stereo display apparatus includes a display panel, which provides an image, and a liquid crystal lens array, which is disposed on an image-transmitting path. The liquid crystal lens array is utilized to respectively project the image provided by the display panel to the left and right eyes of a user, thereby forming a stereo image in human brain through binocular parallax generated after the two eyes respectively receive the image. Under an identical electric potential difference, the liquid crystal lens array has a constant value of effective focal length (EFL), making the stereo display apparatus have a single optimal view distance. In this way, when the user changes his/her view distance, his/her eyes become deviated from the optimal distance and therefore are unable to view a stereo image with an preferable effect of display.

SUMMARY OF THE INVENTION

The disclosure provides a stereo display apparatus having a function of switching between different optimal view distances.

The disclosure provides a stereo display apparatus, including a display panel and an adjustable liquid crystal lens array. The adjustable liquid crystal lens array disposed on the display panel includes a first substrate and a second substrate opposite to the first substrate. The first substrate includes a first base, a first electrode, and a second electrode. The first electrode is disposed on the first base and has a plurality of first branch portions arranged with an identical pitch, and there is a first pitch between any two of the first branch portions that are adjacent. The second electrode is disposed on the first base and has a plurality of second branch portions arranged with an identical pitch. The second branch portions and the first branch portions are arranged alternately along a first direction. There is a second pitch between any two of the second branch portions that are adjacent, wherein the first pitch is larger than the second pitch. The second substrate includes a second base and a third electrode disposed on the second base, and the third electrode is between the first base and the second base. The liquid crystal layer is disposed between the first substrate and the second substrate, and has an equivalent refractive index progressively increasing from any two of the first branch portions that are adjacent to central of the any two of the first branch portions that are adjacent when there is an electric potential difference between the first electrode and the third electrode, or has the equivalent refractive index progressively increasing from any two of the second branch portions that are adjacent to central of the any two of the second branch portions that are adjacent when there is an electric potential difference between the second electrode and the third electrode.

In an embodiment of the disclosure, a cell gap between the first substrate and the second substrate is between 5 micrometers to 60 micrometers.

In an embodiment of the disclosure, the third electrode is a complete conductive layer and fully covers the first electrode and the second electrode.

In an embodiment of the disclosure, the third electrode has a plurality of third branch portions arranged with an identical pitch, having a third pitch between any two of the third branch portions that are adjacent, and arranged along a second direction, wherein the first direction intersects the second direction.

In an embodiment of the disclosure, the first direction is perpendicular to the second direction.

In an embodiment of the disclosure, the second substrate further includes a fourth electrode disposed on the second base and having a plurality of fourth branch portions arranged alternately with the third branch portions along the second direction.

In an embodiment of the disclosure, the first substrate further includes a fifth electrode disposed on the first base, and the fifth electrode is disposed between the first electrode and the second electrode.

In an embodiment of the disclosure, the display panel has a plurality of pixels in an array arrangement, and each of the pixels includes a first sub-pixel, a second sub-pixel, and a third sub-pixel that are arranged along the first direction, wherein the first pitch is equal to twice of a width of each of the pixels on the first direction, and the second pitch is equal to a sum of a width of the first sub-pixel and a width of the second sub-pixel on the first direction.

In an embodiment of the disclosure, the each of the pixels further includes a fourth sub-pixel overlapping the first sub-pixel, the second sub-pixel, and third sub-pixel on the second direction. The first direction intersects the second direction. And the fourth sub-pixel has a width on the first direction equal to a sum of the width of the first sub-pixel, the width of the second sub-pixel, and a width of the third sub-pixel on the first direction.

In an embodiment of the disclosure, the display panel has a plurality of pixels in an array arrangement, and each of the pixels includes a first sub-pixel, a second sub-pixel, and a third sub-pixel that are arranged along the first direction, wherein the first pitch is equal to twice of a width of the each of the pixels on the first direction, the second pitch is equal to a sum of a width of the first sub-pixel and a width of the second sub-pixel on the first direction, and the third pitch is equal to twice of a length of the each of the pixels on the second direction.

Based on the above, the stereo display apparatus drives the electrodes with different pitches of the adjustable liquid crystal lens array to achieve the function of switching different view distances for the stereo display apparatus. Thereby, when the user intends to change the view distance, he/she is allowed to see a stereo image with a preferable effect of display.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
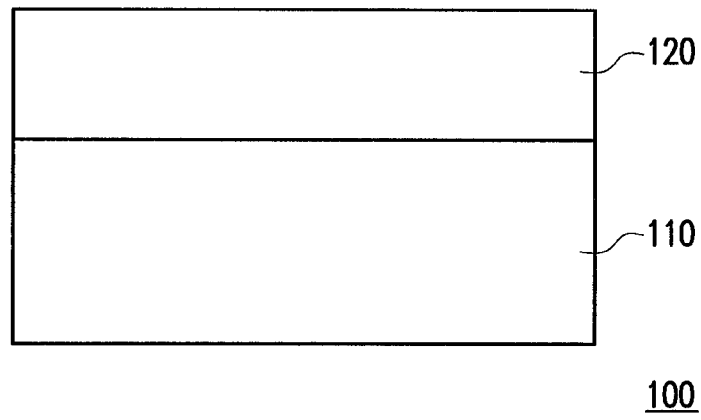
FIG. 1 is a cross-sectional schematic view of a stereo display apparatus according to an embodiment of the disclosure.

FIG. 1 is a cross-sectional schematic view of a stereo display apparatus according to an embodiment of the disclosure. Referring to FIG. 1, a stereo display apparatus 100 includes a display panel 110 and an adjustable liquid crystal lens array 120, wherein the adjustable liquid crystal lens array 120 is disposed on one side of the display panel 110. In this embodiment, the display panel 110 is, for example, a liquid crystal display panel that emerges a polarized light. However, the embodiment is not limited thereto. In other embodiments, the display panel 110 may be any display panel capable of displaying an image, which emerges a polarized light by disposing a polarizer on a light-emitting surface of the display panel, wherein the display panel capable of displaying an image is, for example, an organic electro-luminescence display panel, an electrophoresis display panel, a plasma display panel, an electrowetting display panel, a field emission display panel, or a display panel in other forms.

Figure 2:
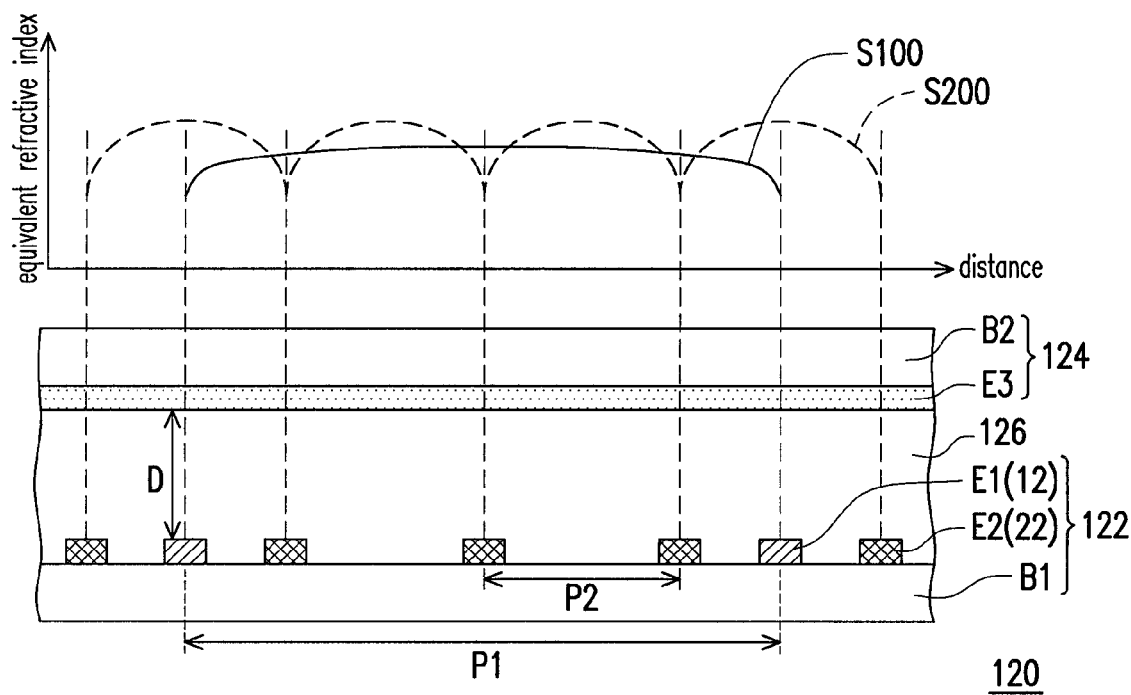
FIG. 2 is a cross-sectional schematic view of an adjustable liquid crystal lens array according to an embodiment of the disclosure.
Figure 3:
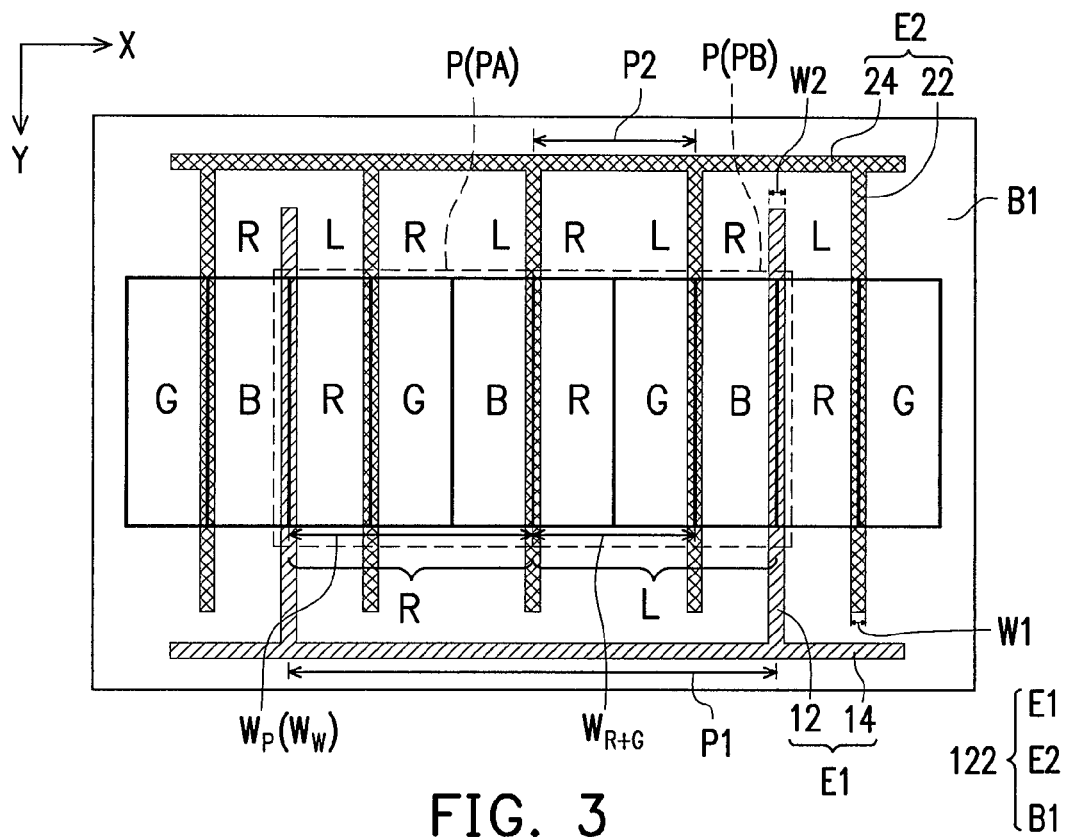
FIG. 3 is a top schematic view of the adjustable liquid crystal lens array of FIG. 2.

FIG. 2 is a cross-sectional schematic view of an adjustable liquid crystal lens array according to an embodiment of the disclosure. FIG. 3 is a top schematic view of a first substrate of the adjustable liquid crystal lens array of FIG. 2. Referring to FIGS. 2 and 3, the adjustable liquid crystal lens array 120 includes a first substrate 122, a second substrate 124 opposite to the first substrate 122 and a liquid crystal layer 126 disposed between the first substrate 122 and the second substrate 124.

The first substrate 122 includes a first base B1, a first electrode E1, and a second electrode E2. The first electrode E1 is disposed on the first base B1 and has a plurality of first branch portions 12. The first branch portions 12 are arranged with an identical pitch, and there is a first pitch P1 between any two of the first branch portions 12 that are adjacent. The second electrode E2 is disposed on the first base B1 and has a plurality of second branch portions 22 arranged with an identical pitch, and there is a second pitch P2 between any two of the second branch portions 22 that are adjacent, wherein the first pitch P1 is larger than the second pitch P2.

In addition, the second branch portions 22 and the first branch portions 12 are arranged alternately along a first direction X, and the second branch portions 22 and the first portions 12 are parallel to each other. In this embodiment, a width W1 of each of the first branch portions 12 and a width W2 of each of the second branch portions 22 are both between 5 micrometers to 10 micrometers. However, the disclosure is not limited thereto. In other embodiments, the width W1 of each of the first branch portions 12 and the width W2 of each of the second branch portions 22 may vary in accordance to different specifications of different products.

Moreover, the first electrode E1 may further include a first connecting portion 14 that connects each of the first branch portions 12, whereas the second electrode E2 may further include a second connecting portion 24 that connects each of the second branch portions 22. In this embodiment, the first connecting portion 14 is, for example, perpendicular to each of the first branch portions 12, whereas the second connecting portion 24 is, for example, perpendicular to each of the second branch portions 22. However, the disclosure is not limited thereto. In other words, in other embodiments, given that the second branch portions 22 and the first branch portions 12 are parallel to each other and are arranged alternately, an included angle between the first connecting portion 14 and each of the first branch portions 12 may not be 90 degrees, and an included angle between the second connecting portion 24 and each of the second branch portions may not be 90 degrees, either.

The second substrate 124 includes a second base B2 and a third electrode E3 disposed on the second base B2. In addition, the third electrode E3 is disposed between the first base B1 and the second base B2. In this embodiment, the third electrode E3, for example, is a complete conductive layer and fully covers the first electrode E1 and the second electrode E2. However, the disclosure is not limited thereto.

It should be noted that the adjustable liquid crystal lens array 120 utilizes a characteristic of birefringence of the liquid crystal layer 126 and applies an electric field to the liquid crystal layer 126, such that liquid crystal molecules in the liquid crystal layer 126 have different tiled conditions according to directions of the electric field. By providing a cell gap D between the first substrate 122 and the second substrate 124 (i.e. the minimal distance between the first substrate 122 and the second substrate 124), an equivalent refractive index of the liquid crystal layer 126 is allowed to present a gradient distribution, and forms a configuration of gradient-index lens (GRIN lens). Therefore, the adjustable liquid crystal lens array 120 converges polarized parallel lights emerged from the display panel 110. In this embodiment, the cell gap D between the first substrate 122 and the second substrate 124 is, for example, between 5 micrometers to 60 micrometers. In addition, since the adjustable liquid crystal lens array 120 of this embodiment converges lights to achieve the effect of stereo display, compared to a display apparatus utilizing liquid crystal barrier to achieve the effect of stereo display, the stereo display apparatus 100 may not be disposed with a polarizing element (e.g. a polarized eyeglass or a polarizer) between the user and the adjustable liquid crystal lens array 120, but still achieve the effect of stereo display by utilizing parallax barrier. In other words, since a polarizing element may not be disposed between the user and the adjustable liquid crystal lens array 120, the stereo display apparatus 100 utilizing the adjustable liquid crystal lens array 120 of this embodiment has a preferable transmittance.

In addition, a GRIN lens has an effective focal length f. A formula of the effective focal length f is in the following:

$$f = \frac{\left(\frac{1}{2}w\right)^2}{2d_{LCL}[n_{LCL,max} - n_{LCL}(w)]}$$

In the formula, w is a diameter of a liquid crystal lens (indicating the first pitch P1 of the first branch portions 12 and the second pitch P2 of the second branch portions 22 described herein), and $d_{LCL}$ is a thickness of a liquid crystal layer. Based on the formula above, the effective focal length f is proportional to a square of the diameter of the liquid crystal lens, and is inversely proportional to the thickness of the liquid crystal layer and a refractive index of liquid crystal. In other words, by modulating the diameter of the liquid crystal lens (i.e. the first pitch P1 and the second pitch P2) and the thickness of the liquid crystal layer (i.e. the cell gap D), different effective focal length fs may be obtained. Namely, modulating the diameter of the liquid crystal lens changes an optimal view distance for viewing the stereo display apparatus.

For example, referring to a schematic curve of equivalent refractive index in FIG. 2, when there is an electric potential difference between the first electrode E1 and the third electrode E3, and the second electrode E2 and the third electrode E3 are provided with a ground potential, the equivalent refractive index of the liquid crystal layer 126 progressively increases from any two of the first branch portions 12 that are adjacent to central of the any two of the first branch portions 12 that are adjacent (as illustrated by an unbroken line S100) and has a symmetrical gradient distribution. Therefore, the adjustable liquid crystal lens array 120 converges the polarized parallel lights emerged from the display panel 110. In addition, since the first branch portions 12, relative to the second branch portions 22, have the first pitch P1 that is longer, and the effective focal length f is proportional to the square of the diameter of the liquid crystal lens (i.e. the size of pitch), the stereo display apparatus 100 provides a longer optimal view distance when there is an electric potential difference between the first electrode E1 and the third electrode E3.

When there is an electric potential difference between the second electrode E2 and the third electrode E3, and the first electrode E1 and the third electrode E3 are provided with a ground potential, the equivalent refractive index of the liquid crystal layer 126 progressively increases from any two of the second branch portions 22 that are adjacent to central of the any two of the adjacent second branch portions 22 (as illustrated by a broken line S200). Here, since the second pitch P2 is shorter than the first pitch P1, the stereo display apparatus provides a shorter optimal view distance. In other words, the stereo display apparatus of this embodiment achieves a function of switching between different optimal view distances by utilizing a design of pitch in each of the electrodes on the first substrate 122 (this embodiment includes the first electrode E1 and the second electrode E2).

Besides, with the design of different pitches, pixels of the display panel may perform different split-screen processes. FIG. 3 illustrates relative positions of the first electrode E1 and the second electrode E2 of FIG. 2 and pixels P of the display panel. As illustrated in FIG. 3, the display panel 110 may have a plurality of pixels P in an array arrangement, wherein each of the pixels P includes a first sub-pixel R, a second sub-pixel G, and a third sub-pixel B. In this embodiment, the first sub-pixel R, the second sub-pixel G, and the third sub-pixel B may be arranged along the first direction X and extend along a second direction Y perpendicular to the first direction X. In addition, the first pitch P1 may be substantially equal to twice of a width $W_P$ of each of the pixels P on the first direction X. The second pitch P2 may be substantially equal to a sum $W_{R+G}$ of widths of the first sub-pixel R and the second sub-pixel G on the first direction X. It should be noted that there are correspondingly different split-screen processes under different dispositions of pitch and branch portion. Thus, this embodiment is not described herein to limit the arrangement and way of extension of sub-pixels and the number of sub-pixels or pixels P to which each pitch corresponds.

Referring to FIGS. 2 and 3, when there is an electric potential between the first electrode E1 and the third electrode E3, two pixels PA and PB between any two of the first branch portions 12 that are adjacent may be split to display an image information of left eye and an image information of right eye. Since the two pixels PA and PB correspond to different equivalent refractive indexes and generate different deflection angles, the left eye of the user may receive the image information of left eye, and the right eye of the user may receive the image information of right eye. Thereby, the user whose eyes are on the first direction X is allowed see a stereo image. Similarly, when there is an electric potential difference between the second electrode E2 and the third electrode E3, two sub-pixels (e.g. G and B, R and G, or B and R) between any two of the second branch portions 22 that are adjacent may be split to display the image information of left eye and the image information of right eye. Since the two sub-pixels correspond to different equivalent refractive indexes and generate different deflection angles, the left and right eyes of the user may also receive the image information of left eye and the image information of right eye from different sub-pixels, thereby viewing an stereo image.

Figure 4:
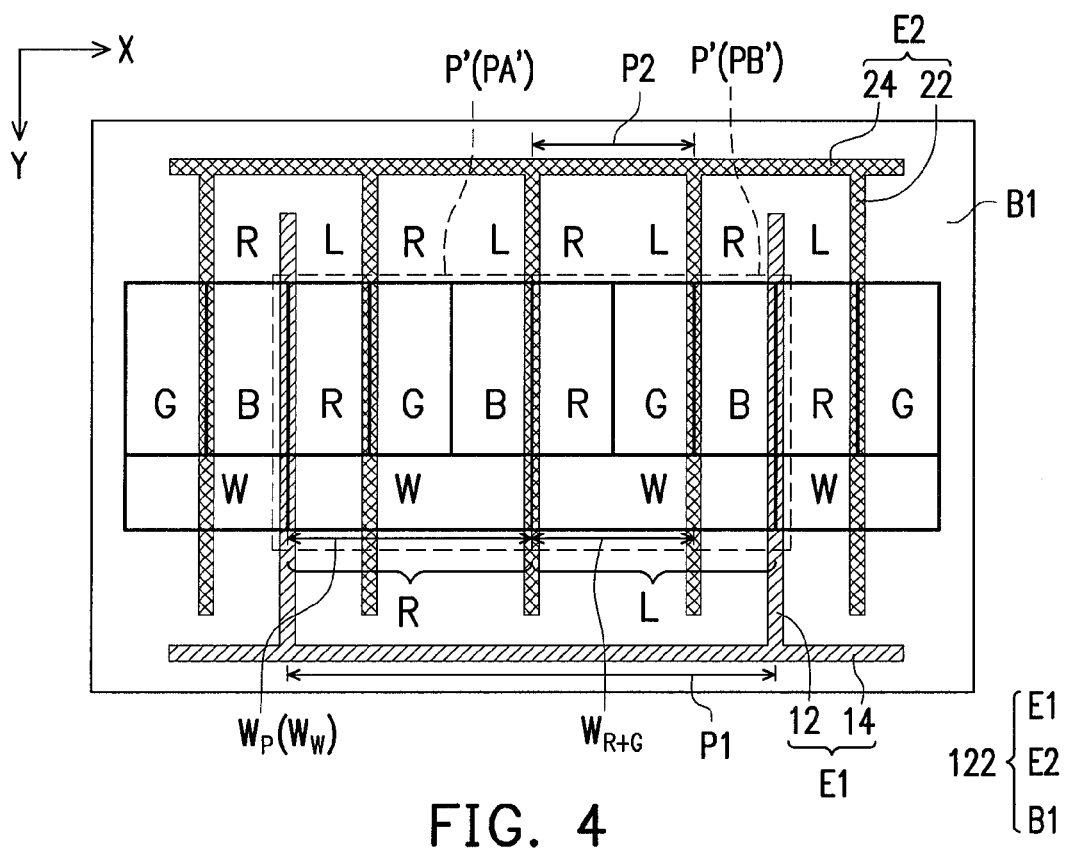
FIG. 4 is a top schematic view of an adjustable liquid crystal lens array according to another embodiment of the disclosure.

A number of sub-pixels of each of the pixels P may vary in accordance with practical needs. FIG. 4 is a top schematic of an adjustable liquid crystal lens array according to another embodiment of the disclosure. Referring to FIG. 4, pixels P' of this embodiment may further include a fourth sub-pixel W, which overlaps the first sub-pixel R, the second sub-pixel G, and the third sub-pixel B on the second direction Y, wherein the first direction X intersects the second direction Y. In this embodiment, the first direction X is, for example, perpendicular to the second direction Y. In addition, a width $W_W$ of the fourth sub-pixel W on the first direction X is substantially equal to a sum of widths of the first sub-pixel R, the second sub-pixel G, and the third sub-pixel B on the first direction X, which is the width $W_P$ of each of the pixels P on the first direction X.

Similar to the three sub-pixels described above, when there is an electric potential difference between the first electrode E1 and the third electrode E3, liquid crystal molecules in the liquid crystal layer 126 that corresponds to location of the first electrode E1 forms a GRIN lens, therefore having an effect of focusing. Two pixels PA' and PB' between any two of the first branch portions 12 that are adjacent respectively display the image information of left eye and the image information of right eye. Through an optical process of the liquid crystal layer 126, the left and right eyes of the user are allowed to respectively receive the image information of left eye and the image information of right eye from the pixels PA' and PB'. Thereby, the user whose eyes are on the first direction X is allowed to see a stereo image. Similarly, when there is an electric potential difference between the second electrode E2 and the third electrode E3, two sub-pixels between any two of the second branch portions 22 that are adjacent (e.g. G and B, R and G, or B and R) may be split to display the image information of left eye and the image information of right eye, such that the left and right eyes of the user is allowed to receive the image information of left eye and the image information of right eye from different sub-pixels and see a stereo image.

Figure 5A:
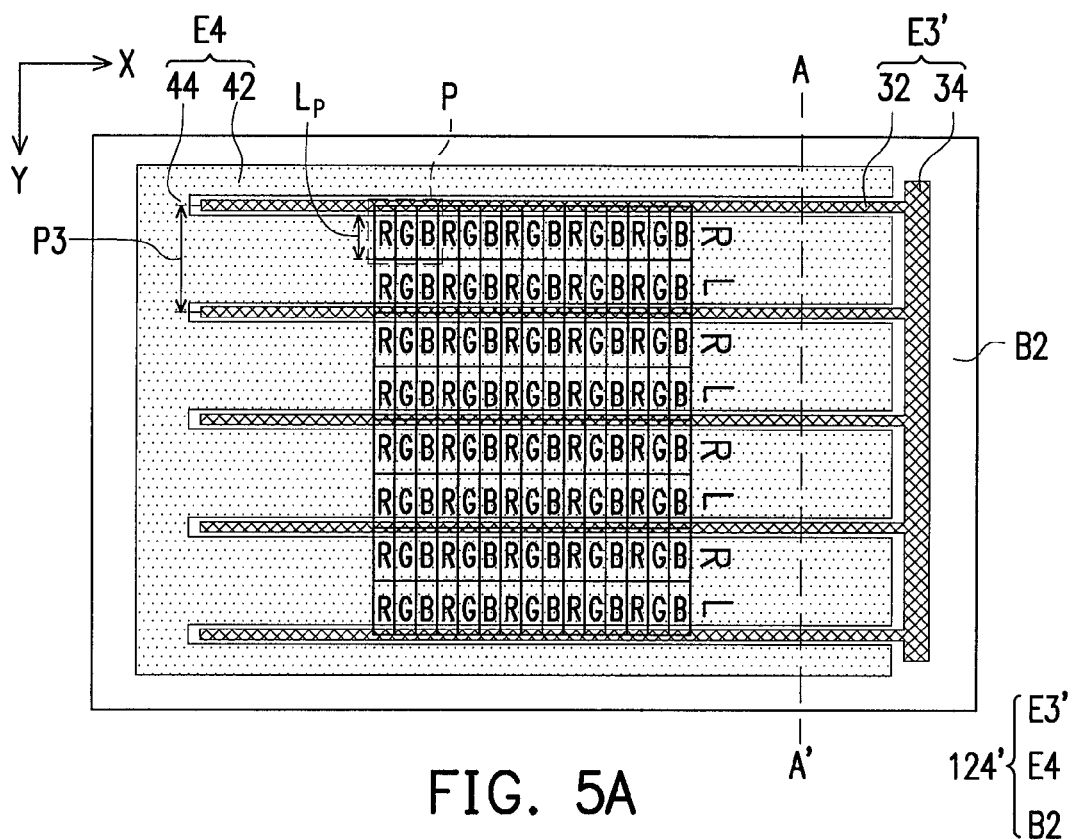
FIG. 5A is a top schematic view of a second substrate according to still another embodiment of the disclosure.
Figure 5B:
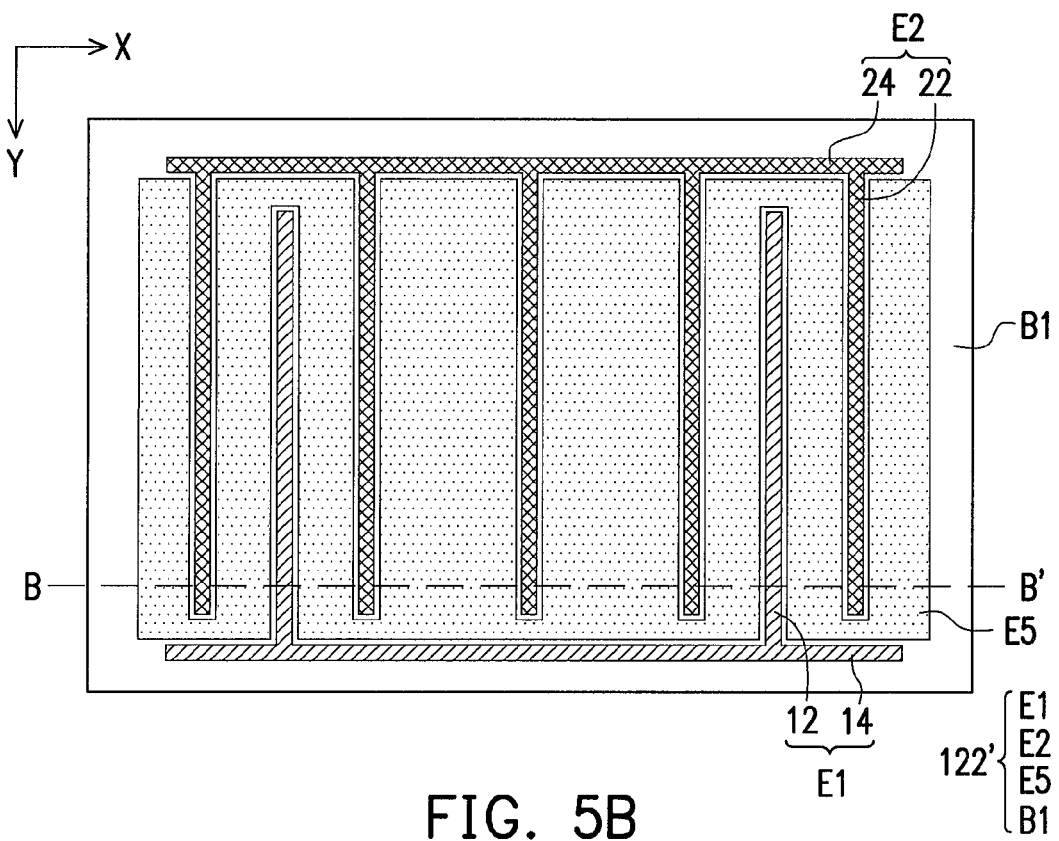
FIG. 5B is a top schematic view of a first substrate arranged with the second substrate illustrated in FIG. 5A.
Figure 5C:
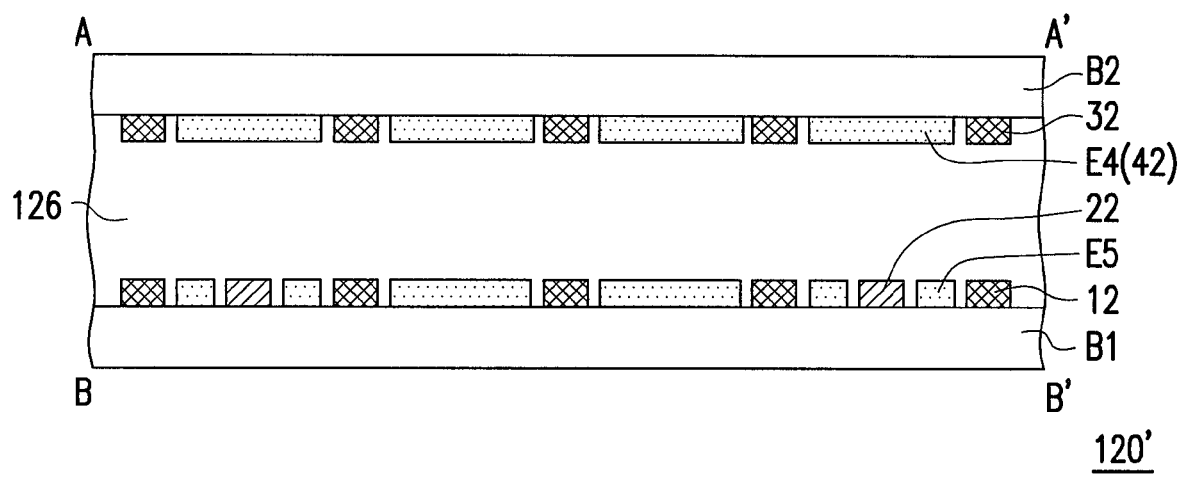
FIG. 5C is a cross-sectional schematic view of the adjustable liquid crystal lens array along profilers A-A' and B-B' in FIG. 5A and FIG. 5B.

In addition, in other embodiments, the third electrode E3 of the second substrate 124 may be a patterned conductive pattern that has another design of electrode structure. FIG. 5A is a top schematic view of a second substrate according to still another embodiment of the disclosure. FIG. 5B is a top schematic view of a first substrate arranged with the second substrate illustrated in FIG. 5A. FIG. 5C is a cross-sectional schematic view of the adjustable liquid crystal lens array along profilers A-A' and B-B' in FIG. 5A and FIG. 5B.

Referring to FIGS. 5A, 5B, and 5C, an adjustable liquid crystal lens array 120' and the adjustable liquid crystal lens array 120 of FIG. 2 have similar and identical elements. A difference between the adjustable liquid crystal lens array 120' and the adjustable liquid crystal lens array 120 lies in that a third electrode E3' of a second substrate 124' has a plurality of third branch portions 32, wherein the third branch portions 32 are arranged with an identical pitch, and there is a third pitch P3 between any two of the third branch portions 32 that are adjacent.

In addition, the second substrate 124' further includes a fourth electrode E4 disposed on the second base B2, wherein the fourth electrode E4 has a plurality of fourth branch portions 42, and the fourth branch portions 42 and the third branch portions 32 are arranged alternately along the second direction Y. In this embodiment, the third electrode E3' may further include a third connecting portion 34 that connects each of the third branch portions 32 and a fourth connecting portions 44 that connects each of the fourth branch portions 42, wherein the third branch portions 32 and the third connecting portion 34 are disposed perpendicularly, and the fourth branch portions 42 and the fourth connecting portion 44 are disposed perpendicularly.

Moreover, a first substrate 122' further includes a fifth electrode E5 disposed on the first base B1, wherein the fifth electrode E5 is disposed between the first electrode E1 and the second electrode E2. Specifically, the fifth electrode E5 extends along a gap between the first electrode E1 and the second electrode E2, and the fifth electrode E5 is electrically insulated from the first electrode E1 and the second electrode E2.

By providing the fourth branch portions 42 and the third branch portions 32 that are alternately arranged on the second direction Y and the fifth electrode E5 extending between the first electrode E1 and the second electrode E2, the adjustable liquid crystal lens array 120' is applied more extensively. For example, a stereo display apparatus utilizing the adjustable liquid crystal lens array 120' is capable of displaying a stereo image utilizing a pixel as a split screen on the first direction X in addition to displaying a stereo image on the second direction Y. Specifically, when the third electrode E3' and the fourth electrode E4 are provided with a ground potential, one of the first electrode E1 and the second electrode E2 may have an electric potential difference from the third electrode E3' and the fourth electrode E4, whereas the other of the first electrode E1 and the second electrode E2 may be provided with a ground potential. In the moment, the user whose eyes are on the first direction X may see a stereo image. Furthermore, by providing a ground potential to the first electrode E1, the second electrode E2, and the fourth electrode E4, and making the third electrode E3' have an electric potential difference between the first electrode E1, the second electrode E2, and the fourth electrode E4, the user whose eyes are on the second direction Y is allowed to see a stereo image. In other words, arranging the first electrode E1 and the second electrode E2 with the third electrode E3' and the fourth electrode E4 having different extending directions, the user is allowed to see a stereo image on different directions.

Specifically, as illustrated in FIG. 5A, under the circumstance that each of the pixels P includes the first sub-pixel R, the second sub-pixel G, and the third sub-pixel B, wherein the first sub-pixel R, the second sub-pixel G, and the third sub-pixel B are arranged along the first direction X, the third pitch P3 here is substantially equal to twice of a length $L_P$ of each of the pixels P on the second direction Y. Therefore, when the third electrode E3' has a electric potential difference from the first electrode E1, the second electrode E2, and the fourth electrode E4, liquid crystal molecules in the liquid crystal layer 126 that correspond to location of the third electrode E3' forms a GRIN lens, therefore having an effect of focusing. By utilizing two of the pixels P between any two of the third branch portions 32 that are adjacent on the second direction Y to display the image information of left eye and the image information of right eye, the user whose eyes are on the second direction Y is allowed see a stereo image. Naturally, in other embodiments, the second substrate 124' may also have an electrode structure similar to the first substrate 122' in this embodiment, so as to provide the stereo display apparatus with a function of switching between different optimal view distances on the first direction X.

In view of the above, the disclosure utilizes the electrodes with a plurality of pitches of the adjustable liquid crystal lens array to allow the stereo display apparatus to achieve the function of switching between different view distances by driving different electrodes. Thereby, when the user intends to change the view distance, he/she is allowed to see a stereo image with a preferable effect of display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A stereo display apparatus, comprising:
   a display panel; and
   an adjustable liquid crystal lens array, disposed on the display panel, comprising:
      a first substrate, comprising:
         a first base;
         a first electrode, disposed on the first base, and having a plurality of first branch portions, the first branch portions arranged with an identical pitch and having a first pitch between any two of the first branch portions that are adjacent, wherein the first pitch is a distance between centers of any two adjacent first branch portions; and
         a second electrode, disposed on the first base, and having a plurality of second branch portions, the second branch portions arranged with an identical pitch, arranged alternately with the first branch portions along a first direction, and having a second pitch between any two of the second branch portions that are adjacent, wherein the second pitch is a distance between centers of any two adjacent second branch portions, wherein the first pitch is larger than the second pitch;

a second substrate, opposite to the first substrate, comprising:
   a second base;
   a third electrode, disposed on the second base and between the first base and the second base; and
a liquid crystal layer, disposed between the first substrate and the second substrate, having an equivalent refractive index progressively increasing from any two of the first branch portions that are adjacent to central of the any two of the first branch portions when there is an electric potential difference between the first electrode and the third electrode, or having an equivalent refractive index progressively increasing from any two of the second branch portions that are adjacent to central of the any two of the second branch portions when there is an electric potential difference between the second electrode and the third electrode, wherein the display panel has a plurality of pixels in an array arrangement, and each of the pixels comprises a first sub-pixel, a second sub-pixel, and a third sub-pixel that are arranged along the first direction, wherein the first pitch is equal to twice of a width of each of the pixels on the first direction, and the second pitch is equal to a sum of a width of the first sub-pixel and a width of the second sub-pixel on the first direction.

2. The stereo display apparatus as claimed in claim 1, wherein a cell gap between the first substrate and the second substrate is between 5 micrometers and 60 micrometers.

3. The stereo display apparatus as claimed in claim 1, wherein the third electrode is a complete conductive layer and fully covers the first electrode and the second electrode.

4. The stereo display apparatus as claimed in claim 1, wherein the third electrode has a plurality of third branch portions arranged with an identical pitch, the third branch portions having a third pitch between any two of the third branch portions that are adjacent, and arranged along a second direction, wherein the first direction intersects the second direction.

5. The stereo display apparatus as claimed in claim 4, wherein the first direction and the second direction are perpendicular.

6. The stereo display apparatus as claimed in claim 4, wherein the second substrate further comprises a fourth electrode disposed on the second base, the fourth electrode having a plurality of fourth branch portions arranged alternately with the third branch portions along the second direction.

7. The stereo display apparatus as claimed in claim 6, wherein the first substrate further comprises a fifth electrode disposed on the first base, the fifth electrode disposed between the first electrode and the second electrode.

8. The stereo display apparatus as claimed in claim 1, wherein each of the pixels further comprises a fourth sub-pixel, the fourth sub-pixel overlapping the first sub-pixel, the second sub-pixel, and the third sub-pixel on a second direction, the first direction intersecting the second direction, and the fourth sub-pixel having a width on the first direction equal to a sum of the width of the first sub-pixel, the width of the second sub-pixel, and a width of the third sub-pixel on the first direction.

9. The stereo display apparatus as claimed in claim 4, wherein the display panel has a plurality of pixels in an array arrangement, and each of the pixels comprises a first sub-pixel, a second sub-pixel, and a third sub-pixel that are arranged along the first direction, wherein the first pitch is equal to twice of a width of each of the pixels on the first direction, the second pitch is equal to a sum of a width of the first sub-pixel and a width of the second sub-pixel on the first direction, and the third pitch is equal to twice of a length of the each of the pixels on the second direction.

* * * * *